(12) United States Patent
Negre et al.

(10) Patent No.: US 12,668,363 B2
(45) Date of Patent: Jun. 30, 2026

(54) GALLEY INSERT CHILLED BEVERAGE DISPENSING DEVICE

(71) Applicant: B/E Aerospace, Inc., Winston Salem, NC (US)

(72) Inventors: Ergen Sawit Negre, Santo Tomas (PH); Jobelle Cantuba Bermudo, Lipa City (PH); Marjaniza-Li Pilapil Ladres, San Pascual (PH); Jomel Quides Vibar, Cabuyao (PH); Christian Zapata, Batangas City (PH); Ariel A. Amoncio, Binan (PH)

(73) Assignee: B/E AEROSPACE, INC., Winston Salem, NC (US)

( * ) Notice: Subject to any disclaimer, the term of this patent is extended or adjusted under 35 U.S.C. 154(b) by 252 days.

(21) Appl. No.: 18/478,670

(22) Filed: Sep. 29, 2023

(65) Prior Publication Data

US 2024/0174365 A1     May 30, 2024

(30) Foreign Application Priority Data

Nov. 28, 2022    (EP) ..................................... 22210026

(51) Int. Cl.
| | |
|---|---|
| *B64D 11/04* | (2006.01) |
| *B67D 1/08* | (2006.01) |
| *B67D 1/16* | (2006.01) |

(52) U.S. Cl.
CPC ............ *B64D 11/04* (2013.01); *B67D 1/0805* (2013.01); *B67D 1/0862* (2013.01); *B67D 1/0871* (2013.01); *B67D 1/0884* (2013.01); *B67D 1/0892* (2013.01); *B67D 1/16* (2013.01)

(58) Field of Classification Search
CPC .... B64D 11/04; B67D 1/0805; B67D 1/0862; B67D 1/0871; B67D 1/0884; B67D 1/0892; B67D 1/16
See application file for complete search history.

(56) References Cited

U.S. PATENT DOCUMENTS

| | | | | |
|---|---|---|---|---|
| 185,232 | A | * | 12/1876 | Hepperly ................. B67D 1/16 |
| | | | | 222/108 |
| 3,669,314 | A | | 6/1972 | Goings |
| 4,011,896 | A | * | 3/1977 | Nilon ....................... B67D 1/08 |
| | | | | 141/82 |
| 7,044,335 | B2 | | 5/2006 | Aguirre et al. |

(Continued)

FOREIGN PATENT DOCUMENTS

| | | |
|---|---|---|
| EP | 3643989 | 4/2020 |
| WO | 2019060951 | 4/2019 |

OTHER PUBLICATIONS

European Patent Office, European Office Action dated Jun. 27, 2025 in Application No. 22210026.5.

(Continued)

*Primary Examiner* — Donnell A Long
(74) *Attorney, Agent, or Firm* — SNELL & WILMER L.L.P.

(57) ABSTRACT

A galley insert chilled beverage dispensing device comprising: a body configured to be inserted into a vehicle galley insert, wherein the body comprises an integrated storage tank configured to store the beverage; a filling inlet fluidly connected to the storage tank; an output faucet fluidly connected to the storage tank; and a cooling system configured to cool the beverage stored in the storage tank.

14 Claims, 5 Drawing Sheets

(56)                    References Cited

U.S. PATENT DOCUMENTS

| | | | |
|---|---|---|---|
| 9,797,652 B1 | 10/2017 | Wilkerson | |
| 10,053,355 B2 | 8/2018 | Garcia et al. | |
| 11,555,302 B2 * | 1/2023 | Kop | F24H 15/223 |
| 2016/0368753 A1 * | 12/2016 | Bethuy | A47J 31/4403 |
| 2020/0369505 A1 | 11/2020 | McKay | |
| 2022/0002132 A1 * | 1/2022 | Ray | B67D 1/1277 |
| 2022/0018589 A1 | 1/2022 | Miller | |

OTHER PUBLICATIONS

EPO, Extended European Search Report dated Apr. 17, 2023 in EP
Serial No. 22210026.5.

* cited by examiner

GALLEY INSERT CHILLED BEVERAGE DISPENSING DEVICE

CROSS-REFERENCE TO RELATED APPLICATIONS

This application claims priority to, and the benefit of, EP Patent Application No. 22210026.5, filed Nov. 28, 2022 and titled "GALLEY INSERT CHILLED BEVERAGE DISPENSING DEVICE," which is incorporated by reference herein in its entirety for all purposes.

FIELD

This disclosure relates to a galley insert beverage dispensing device. More particularly, the disclosure relates to a galley insert chilled beverage dispensing device which is configured to cool the dispensed beverage.

BACKGROUND

Although hot water dispensers are used in vehicle galleys (for the provision of hot drinks such as tea and coffee) currently, cold beverages (such as beer, cider, and soft drinks) are served on aircraft using cans and bottles. The beverages are usually served with a cup containing ice. Alternatively, the cans and/or bottles may have been stored in a refrigerator prior to serving.

SUMMARY

According to this disclosure, there is provided a galley insert chilled beverage dispensing device comprising:

a body configured to be inserted into a vehicle galley insert, wherein the body comprises an integrated storage tank configured to store the beverage;

a filling inlet fluidly connected to the storage tank;

an output faucet fluidly connected to the storage tank; and a cooling system configured to cool the beverage stored in the storage tank.

An integrated storage tank will be understood to mean a storage tank which is a part of the dispensing device itself. As such, it will be understood that existing receptacles (such as bottles, kegs, and cans) are not integrated storage tanks which are comprised by the body of the galley insert chilled beverage dispensing device.

In embodiments, the cooling system comprises a cooling element located proximal to (e.g. at or close to the location of) the storage tank. In embodiments, the cooling element is in thermal communication with the storage tank.

In embodiments, the cooling element is in contact with (e.g. touching) an outer surface of the storage tank. In embodiments, the cooling element surrounds the outer surface of the storage tank, e.g. in a spiral.

In embodiments, the galley insert chilled beverage dispensing device comprises a layer of insulation at least partially surrounding the storage tank and the cooling element.

In embodiments, the cooling element comprises an evaporator element, and the cooling system further comprises a condenser element located remote from the storage tank, and a compressor fluidly connected between the evaporator element and the condenser element. In such embodiments, the cooling system will work by circulating a refrigerant between the evaporator element and the condenser element, as is known.

In embodiments the cooling system is configured to cool the beverage to sub-zero temperatures (temperatures lower than 0° C.), for example, in embodiments the cooling system is configured to cool the beverage to temperatures in the range range 0° C. to −6° C. In embodiments, the cooling system is configured to cool the beverage in the storage tank to a temperature in the range −4° C. to −6° C. Such embodiments may be preferable for alcoholic beverages, such as lager, where a sub-zero serving temperature is often preferred.

The output faucet may be located lower than the storage tank such that the beverage may be dispensed simply by opening a valve and allowing the beverage to flow out of the output faucet due to gravity. However, in embodiments, the galley insert chilled beverage dispensing device comprises a pump configured to draw the beverage from the storage tank out of the output faucet. In embodiments, the pump may be electrically operated.

In embodiments, the storage tank has a capacity in the range 10-25 litres. A galley insert chilled beverage dispensing device having a storage tank of this capacity may be sized to fit into a standard "double oven" sized galley compartment.

In embodiments, the galley insert chilled beverage dispensing device comprises a pressure release system fluidly connected to the storage tank and configured to release pressure from the storage tank when pressure in the storage tank exceeds a predetermined threshold value. The pressure release system may comprise a pressure release valve. The pressure release valve may be any suitable pressure release valve, such as a spring biased pressure release valve.

In embodiments, the filling inlet comprises a spout (e.g. the filling inlet protrudes from the galley insert chilled beverage dispensing device).

The spout may be fixed, but in embodiments the spout is moveable between an open position, in which a liquid can be added to the storage tank, and a closed position, in which liquid cannot be added to the storage tank.

In embodiments the galley insert chilled beverage dispensing device comprises a storage tank waste pipe fluidly connected to the storage tank (e.g. to the base of the storage tank) and to a waste outlet, wherein the storage tank waste pipe is configured to drain the storage tank. The storage tank waste pipe may be opened and closed by a tank waste pipe valve.

In embodiments, the galley insert chilled beverage dispensing device comprises a sink positioned below the output faucet and configured to capture any spilled beverage. In embodiments, the galley insert chilled beverage dispensing device further comprises a sink waste pipe fluidly connected to the sink and to a waste outlet, wherein the sink waste pipe is configured to drain the sink (e.g into the waste outlet).

In embodiments the galley insert chilled beverage dispensing device comprises a liquid level sensor configured to provide information indicative of the fill level of the storage tank. The liquid level sensor may be any suitable sensor type. Suitable liquid level sensor types include capacitance liquid level sensors, optical water level sensors, and float liquid level sensors.

In embodiments, the galley insert chilled beverage dispensing device comprises a temperature sensor configured to provide information indicative of the temperature of the beverage inside the storage tank. In further embodiments, the galley insert chilled beverage dispensing device comprises a display (e.g. a screen or an indicator light) which may be configured to indicate to a user when the beverage in the storage tank has reached an acceptable serving temperature.

It will be understood that references made herein to the terms "below", "above", "top", "bottom", "higher", "lower", "base" are intended to refer to the situation where the galley insert chilled beverage device is in its normal orientation (the orientation shown in the Figures).

BRIEF DESCRIPTION OF THE DRAWINGS

One or more non-limiting examples will now be described, by way of example only, and with reference to the accompanying figures in which.

DETAILED DESCRIPTION

The below described embodiments will be understood to be exemplary only. Further, although the below described embodiments are discussed in relation to an aircraft galley, it will be understood that the galley insert chilled beverage dispensing device of the present disclosure may be used in any vehicle galley. For example, the galley of a coach, or a train.

Figure 1:
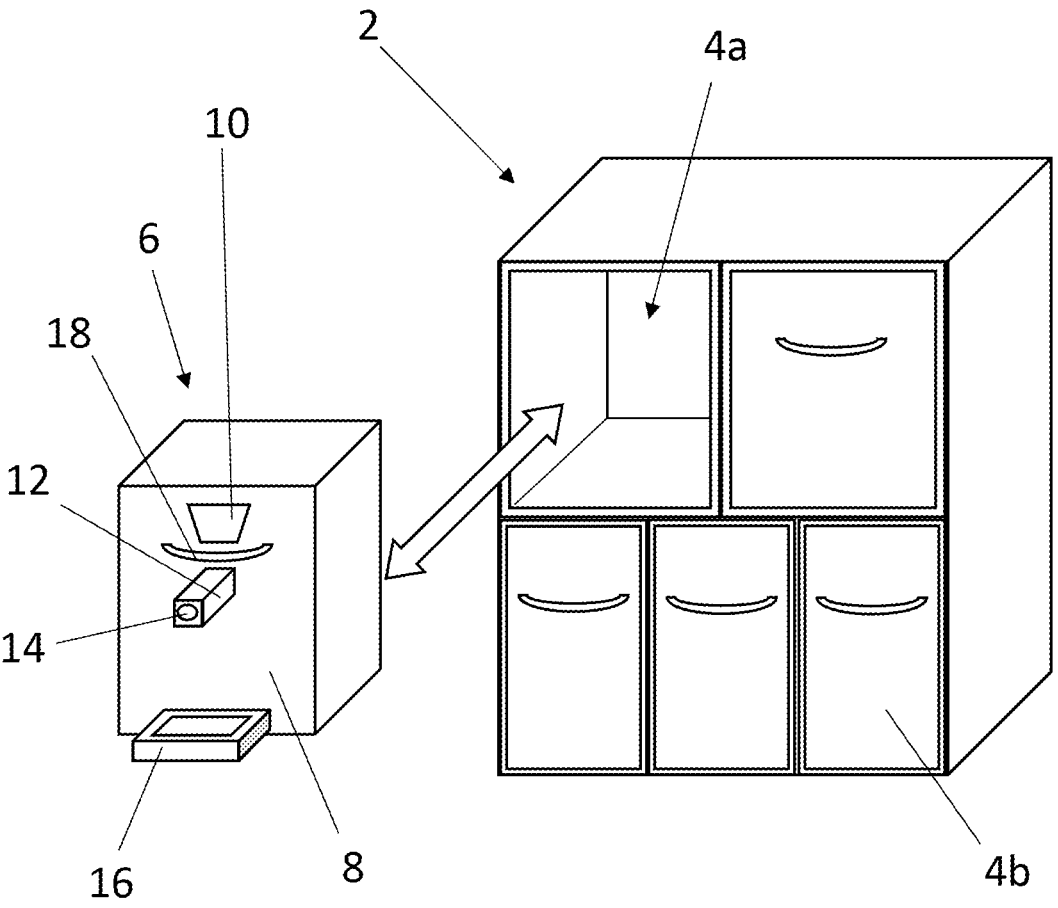
FIG. 1 shows a perspective view of a vehicle galley, and a galley insert chilled beverage dispensing device in accordance with an embodiment of the invention.

FIG. 1 shows a vehicle galley 2 (such as an aircraft galley), containing a plurality of galley compartments 4a, 4b. FIG. 1 also shows a chilled beverage dispensing device 6 configured to be received within a galley compartment 4. In the illustrated embodiment, the vehicle galley 2 comprises two sizes of compartment 4, large galley compartments 4a and small galley compartments 4b. The large compartments 4a may house larger appliances such as galley ovens (not shown) whilst the small compartments 4b may simply be used for storage. In the illustrated embodiment, the chilled beverage dispensing device 6 is configured to be received within a large galley compartment 4a.

As can be seen from FIG. 1, on its front face 8, the chilled beverage dispensing device 6 comprises a filling inlet in the form of an inlet spout 10 configured to receive the beverage when the chilled beverage dispensing device 6 is being filled. The chilled beverage dispensing device 6 has an output faucet 12 that is configured to dispense the chilled beverage and a button 14 is provided on the output faucet 12. The button 14 and the output faucet 12 are configured to dispense beverage the output faucet 12 when the button 14 is depressed. A sink 16 is located directly below the output faucet 12, to catch any spilt beverage. A handle 18 is located on the front of the chilled beverage dispensing 6, which improves the ease with which the chilled beverage dispensing device 6 may be placed in, and removed from, the galley compartment 4a.

Figure 2:
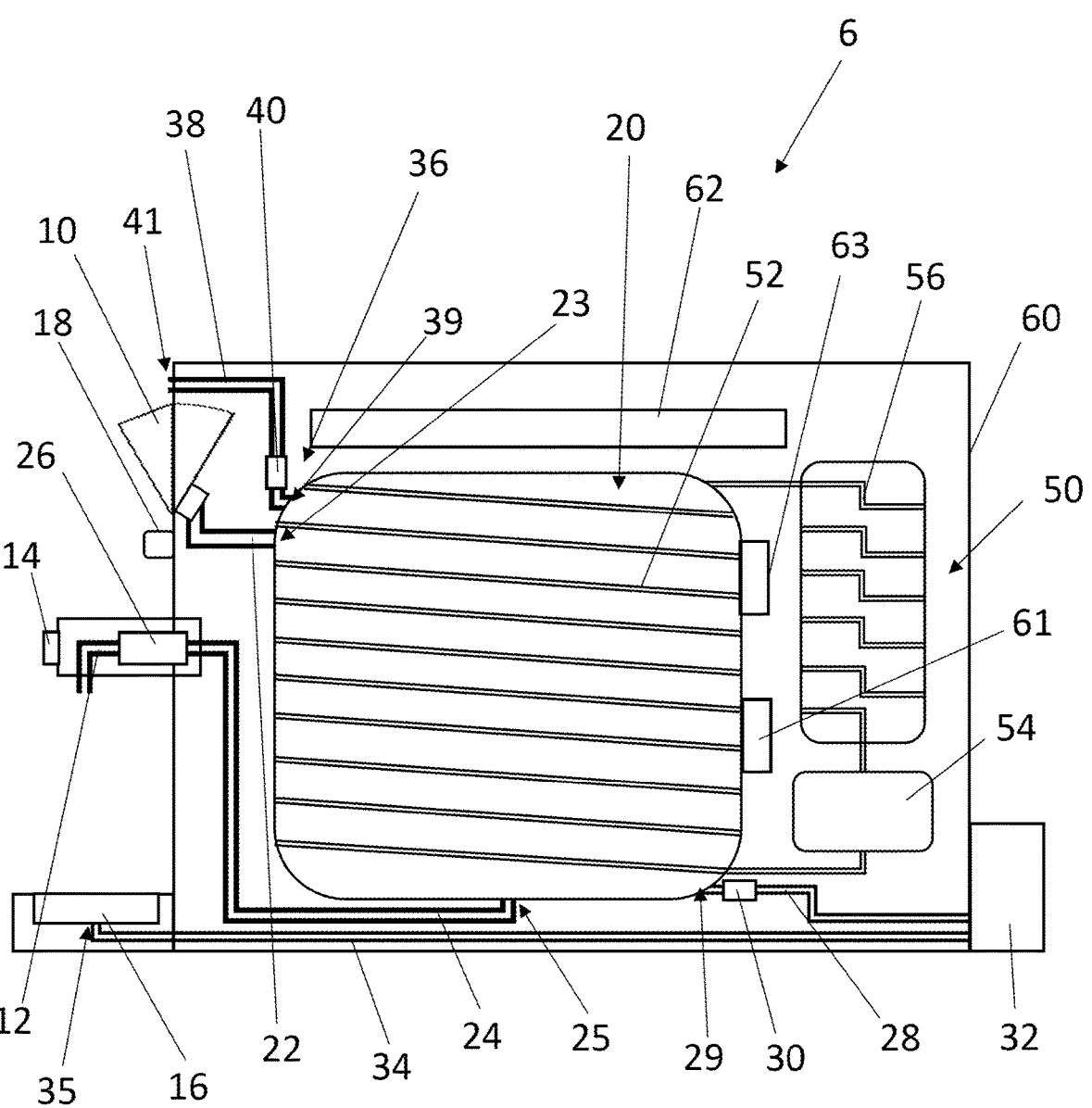
FIG. 2 shows a cutaway view of a galley insert chilled beverage dispensing device in accordance with an embodiment of the invention.

FIG. 2 shows a cross-sectional cutaway view of the chilled beverage dispensing device 6. As in FIG. 1, the inlet spout 10, output faucet 12, push-button 14, sink 16, and handle 18 can be seen on the front face 8 of the chilled beverage dispensing device 6. The volume of the chilled beverage dispensing device 6 is predominantly occupied by a storage tank 20. In the illustrated embodiment, the storage tank 20 is approximately cuboidal although it will be understood that the storage tank 20 may be any suitable shape. For example, the storage tank 20 may be shaped to fill the space between the other internal components of the chilled beverage dispensing device 6 in order to maximize the available storage volume. In the illustrated embodiment, the storage tank has a capacity of 20 litres.

The storage tank 20 is fluidly connected to the inlet spout 10 via an inlet pipe 22. The output 23 of the inlet pipe 22 into the storage tank 20 is lower than the inlet spout 10 such that the storage tank 20 can be filled from the inlet spout using gravity. An embodiment of the inlet spout 10 is described in detail below with reference to FIGS. 4, 5a and 5b.

The storage tank 20 is also fluidly connected to the output faucet 12 via an output pipe 24. The inlet 25 of the output pipe 24 is located at the base of the storage tank 20 in order to avoid beverage wastage (as a result of liquid being trapped below the inlet 25). The inlet 25 of the output pipe 24 is thus an outlet of the storage tank 20.

The output faucet 12 comprises an electrically operated pump mechanism 26 which is configured to draw the beverage, from the storage tank 20, through the output pipe 24, and out of the output faucet 12, in response to the push-button 14 being depressed by a user. The pump mechanism 26 also comprises a valve (not shown). When the pump mechanism 26 is operated by depressing the button 14, the valve opens, but when the button 14 is not depressed, the valve remains closed in order to prevent unwanted leakage.

The storage tank 20 is also fluidly connected to a tank waste pipe 28. The tank waste pipe 28 comprises a valve 30 configured to open and close the tank waste pipe 28. The inlet 29 of the tank waste pipe 28 is located at the base of the storage tank 20 in order to ensure that all liquid may be drained from the storage tank 20 when the valve 30 is opened. The tank waste pipe 28 is configured to connect to a galley waste (not shown) via a connector 32.

As explained in relation to FIG. 1, a sink 16 protrudes from the front face 8 of the chilled beverage dispensing device 6 directly below the output faucet 12. The sink 16 acts to catch spilt liquid. Although it is envisaged that the sink may be self-contained, and may need to be emptied when full, in the illustrated embodiment, the sink 16 is fluidly connected to a sink waste pipe 34. The input 35 of the sink waste pipe 34 is located at the base of the sink 16 in order to ensure that all liquid may be drained from the sink 16. The sink waste pipe 34 is configured to connect to a galley waste (not shown) via the connector 32.

The storage tank is also fluidly connected to a pressure release system 36. The pressure release system 36 comprises a pressure release pipe 38, and a pressure release valve 40 for selectively closing and opening the pressure release pipe 38. The inlet 39 to the pressure release pipe 38 is located close to the top of the storage tank 20. This helps to reduce the likelihood of liquid being expelled from the storage tank 20 via the pressure release pipe 38.

In the illustrated embodiment, the output 41 of the pressure release pipe 38 protrudes from the front face 8 of the chilled beverage dispensing device 6. The pressure release valve 40 is designed to be overcome (and to open) when a threshold pressure is exceeded. The threshold pressure is set such that the pressure release valve 40 will be overcome, and hence pressure will be vented from the storage tank 20 via the pressure release pipe 38, before the storage tank 20 is at risk of being damaged (e.g. ruptured) as a result of excessive internal pressure.

The chilled beverage dispensing device 6 further includes a cooling system 50. The cooling system 50 comprises a cooling element 52 which is in contact with the exterior surface of the storage tank. In the illustrated embodiment, the cooling element 52 is an evaporator element and the cooling system 50 further comprises a compressor 54, and a condenser element 56.

Refrigerant is circulated between the condenser element 56 and the evaporator element 52. The evaporator element 52 converts the refrigerant from liquid to gas. During this process, heat transfer occurs in the evaporator element 52 and the surface of the element 52 is cooled, in turn cooling the surface of the storage tank 20 and thus cooling the liquid (the beverage) inside.

Once the refrigerant has moved through the evaporator element 52, it passes into the compressor 54 which increases pressure on the gas. This causes the gas to condense into a liquid state. As the refrigerant changes into its liquid state, the refrigerant releases the heat which it has absorbed from the storage tank 20. The heat is dispersed by the condenser element 56. The liquid refrigerant then moves back into the evaporator element 52 and the cycle continues.

In the illustrated embodiment, the evaporator element 52 is formed as a coil which wraps around the storage tank 20 a plurality of times. The illustrated arrangement may be advantageous for cooling since the cooling is approximately evenly distributed across the storage tank 20.

In embodiments, the chilled beverage dispensing device 6 may be configured to dispense chilled beer. Since beer has a freezing point below 0□C, and many lagers are best enjoyed at sub-zero temperatures, the cooling system 50 of the illustrated embodiment is configured to cool the liquid in the storage tank to a temperature in the range –4□C to –6□C.

On the back face 60 of the chilled beverage dispensing device the connector 32 is provided. The connector 32 may be a universal fitting designed to interface with a corresponding universal fitting provided on the interior of galley compartments 4. Electrical power may be provided to the chilled beverage dispensing device through the connector 32 whilst waste products may be extracted from the chilled beverage dispensing device through the connector 32.

FIG. 2 also shows that the chilled beverage dispensing device 6 comprises control electronics 62. For clarity of the Figures, the connections between the control electronics and the components of the chilled beverage dispensing device 6 have not been shown, but it will be understood that the control electronics 62 are connected to electrical components of the chilled beverage dispensing device 6 as necessary. For example, the control electronics 62 control the cooling system 50, the faucet pump 26, and the tank waste pipe valve 30.

In the illustrated embodiment, the chilled beverage dispensing device 6 comprises a temperature sensor 63, configured to provide information indicative of the temperature of the beverage inside the storage tank 20.

In embodiments, the control electronics 62 control the operation of the cooling system 50 based on the temperature readings from the temperature sensor 63. The control electronics 62 may comprise a memory storing a pre-set temperature limit depending on the liquid being chilled. It may therefore instruct the cooling system 50 to shut down when the control electronics 62 receive temperature sensor readings from the temperature sensor 63 that the pre-set temperature limit has been reached. Further, in embodiments, the chilled beverage dispensing device 6 may comprise a display such as a screen or indicator light, and the control electronics 62 may be configured to send a signal to the display when it is determined that the beverage inside the storage tank 20 has reached an acceptable serving temperature.

The chilled beverage dispensing device 6 of the illustrated embodiment also comprises a liquid level sensor 61 configured to provide information indicative of the fill level of the storage tank 20. The liquid level sensor 61 may be any suitable type of liquid level sensor. Suitable liquid level sensor types include capacitance liquid level sensors, optical water level sensors, and float liquid level sensors.

Figure 3:
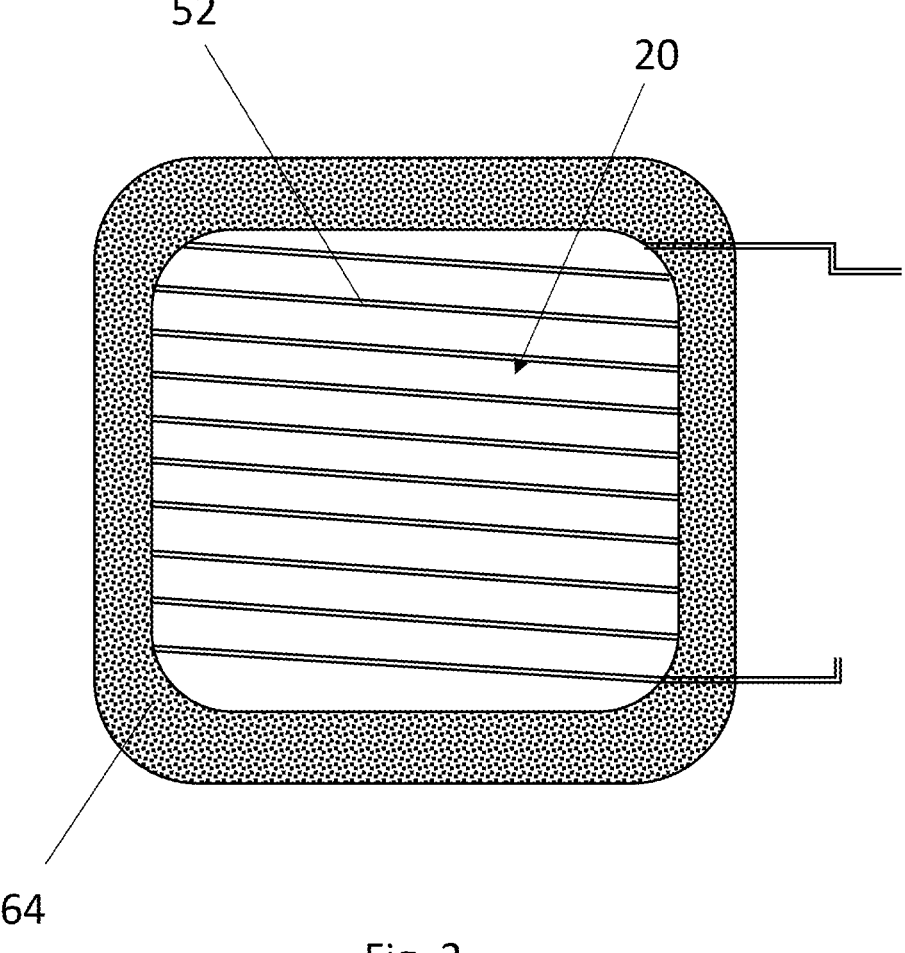
FIG. 3 shows a cutaway view of an insulated storage tank.

FIG. 3 shows the storage tank 20, separate from the chilled beverage dispensing device 6. As shown in FIG. 3, both the cooling element 52 and the storage tank 20 are surrounded by a layer of insulation 64. Any suitable insulation may be used, such as insulating foam. The insultation 64 helps to increase the efficiency of the cooling and thus helps to reduce the power consumption of the chilled beverage dispensing device 6. In particular, the insulation 64 may prevent the heat dispersed by the condenser element 56 from re-entering the liquid (beverage) in the storage tank 20.

The storage tank 20 may be made from any suitable material, but thermally conductive materials (such as metals) may be advantageous for improving the thermal coupling between the cooling element 52 and the beverage inside the storage tank 20.

Figure 4:
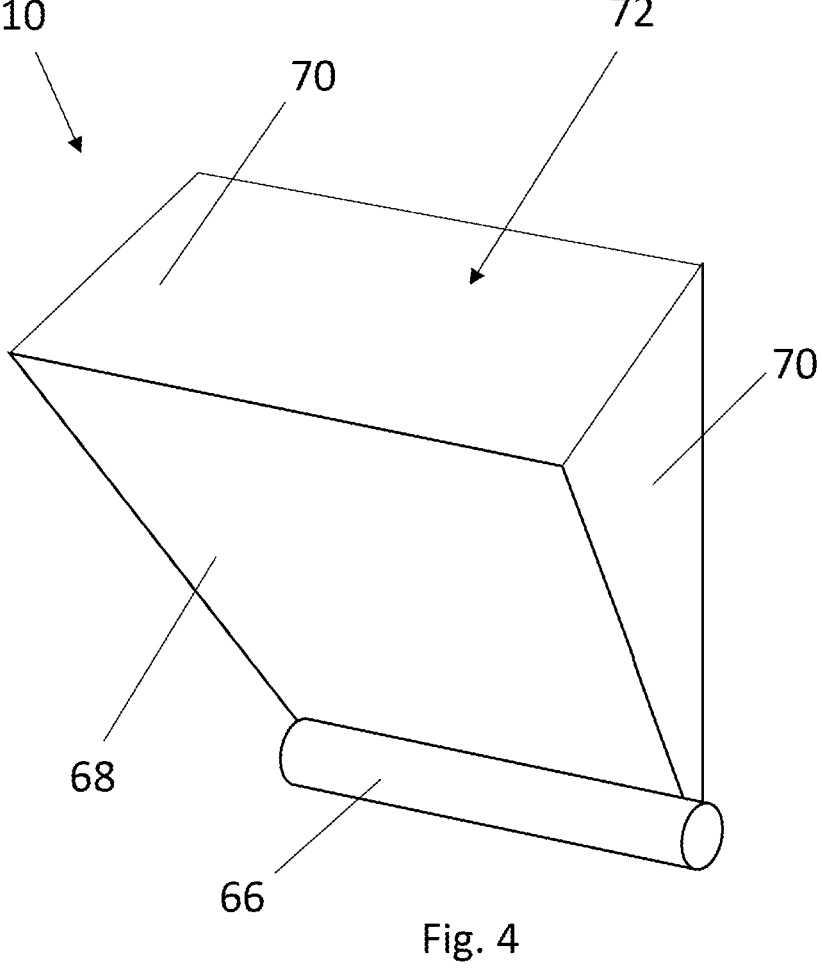
FIG. 4 shows a perspective view of the inlet spout of the chilled beverage dispensing device in an open position.

FIG. 4 shows a perspective view of the inlet spout 10 according to an exemplary embodiment of the invention. In the illustrated embodiment, the spout 10 is retractable (e.g. moveable between an open position and a closed position). FIG. 4 shows the spout 10 in the open position. The spout 10 comprises a hinge 66 provided at its base. The spout 10 comprises a trapezium shaped front wall 68, with its base being narrower than its top, and two triangular side walls 70 which protrude perpendicularly from the front wall 68 to define a volume 72.

When the spout 10 is in the open position, the volume 72 is open, and can receive liquid in order to allow the storage tank 20 to be filled using the spout 10. The spout 10 comprises a hinge 74 provided at the base of the front wall 68. The hinge 74 allows the spout 10 to move between an open position and a closed position.

Figure 5A:
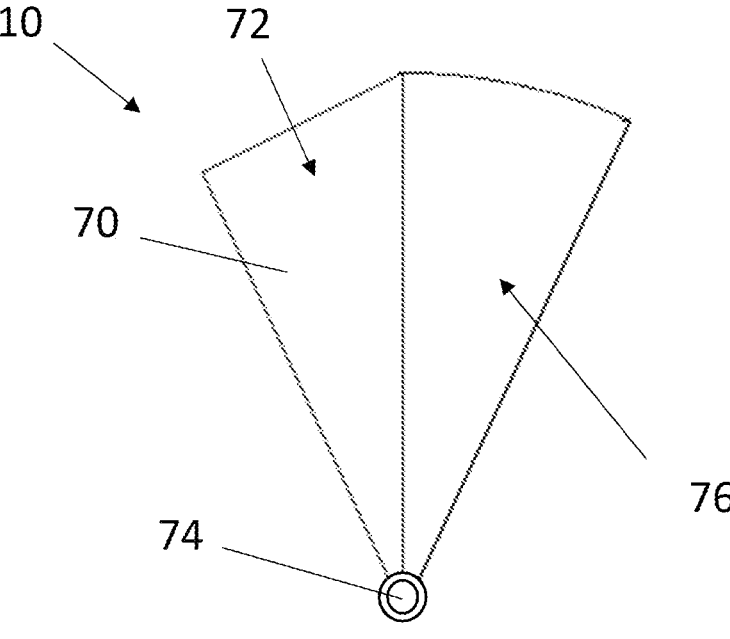
FIG. 5a shows a profile view of the inlet spout of the chilled beverage dispensing device in an open position.
Figure 5B:
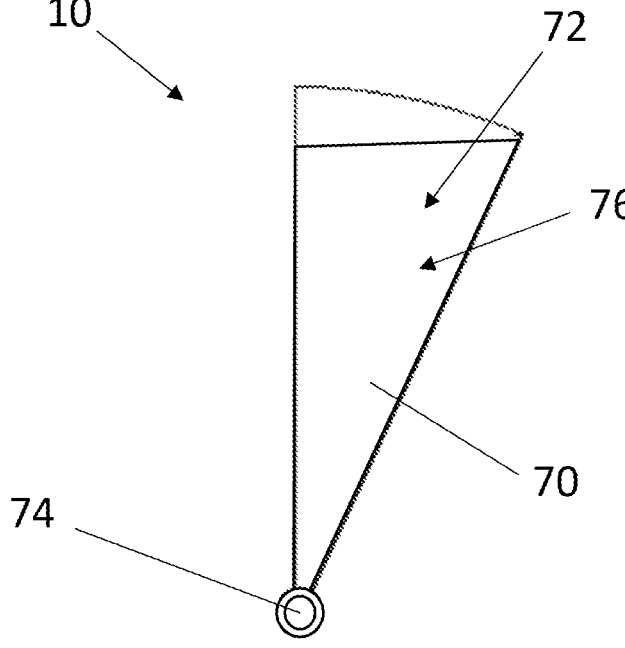
FIG. 5b shows a profile view of the inlet spout of the chilled beverage dispensing device in a closed position.

FIGS. 5*a* and 5*b* show a profile view of the spout 10 in an open and closed position respectively. The chilled beverage dispensing device 6 defines a volume 76 configured to receive the side walls 70 of the spout 10 such that the volume 72 defined by the spout is received within the volume 76 defined by the chilled beverage dispensing device 6. In the closed position, the front wall 68 aligns with the front face 8 of the chilled beverage dispensing device 6. The ability to close the spout 10 reduces the risk of the liquid in the storage tank 20 being accidentally, or deliberately, contaminated by unwanted substances entering the spout 10.

It will be understood that the embodiment shown in FIGS. 4, 5*a*, and 5*b* is purely exemplary, and other collapsible spouts are envisaged. For example, the spout 10 may be made from a flexible material (such as soft rubber). In such embodiments, a hinge may not be required. The spout 10 may comprise a handle (not shown) to enable a user to more easily open the spout 10, alternatively, the spout 10 may be biased into the open position, but held closed on a catch. A button or lever may therefore be provided to release the catch and more the spout 10 to the open position.

The overall function of the chilled beverage dispensing device 6 will now be described. A user (such as a flight attendant) moves the spout 10 into the open position. The user then pours liquid into the spout 10 in order to fill the storage tank 20 with the desired beverage. The filling may be done by emptying cans or bottles, or alternatively, a keg or other vessel may be used to fill the storage tank 20.

Whilst in the storage tank 20, the liquid (beverage) is cooled by the cooling system 50. The control electronics 62 control the operation of the cooling system 50 based on the temperature sensor readings from the temperature sensor 63, e.g. to maintain the temperature of the liquid in a desired temperature range.

When the user wants to dispense a beverage from the chilled beverage dispensing device 6, they place a receptacle (such as a cup) beneath the output faucet 12, and depress the button 14. This causes the electrically operated pump mechanism 26 to draw liquid from the storage tank 20, through the output pipe 24, and out of the faucet 12. Any spillages are caught by the sink 16, and disposed of via the sink waste pipe 34.

When it is necessary for the storage tank 20 to be cleaned, cleaning fluid (which may simply be water) can be poured into the spout 10. This cleaning fluid can then be drained from the storage tank by opening the tank waste pipe valve 30 and allowing the cleaning fluid to drain through the tank waste pipe 28.

It will be seen from the above that, in some embodiments, the thermal coupling between the storage tank and the cooling element may be improved.

It will be seen from the above that, in some embodiments, the efficiency of the galley insert chilled beverage dispensing device may be improved by better maintaining the chilled temperature of the beverage.

It will be seen from the above that, in some embodiments, providing a pump to dispense the beverage may help to regulate the flow from the faucet. For example, where the flow is gravitational, the flow rate will be greater when the storage tank is full than when it is almost empty. Using a pump to dispense the beverage may ensure that the flow is regular. Further, providing a pump (and thus not relying on gravity) provides a greater degree of design freedom in the positioning of the output faucet on the galley insert chilled beverage dispensing device. This is of particular advantage since space is limited on galley inserts, and there must be sufficient space for a receptacle to be placed beneath the faucet.

It will be seen from the above that, in some embodiments, the ability to move the spout to a closed position may reduce the risk of the liquid in the storage tank being accidentally, or deliberately, contaminated by unwanted substances entering the spout It will be seen from the above that, in some embodiments, the tank waste pipe may be particularly advantageous during cleaning. Cleaning fluid (which may simply be water) can be poured into the filling inlet. This cleaning fluid can then be drained from the storage tank by opening the tank waste pipe valve and allowing the cleaning fluid to drain through the tank waste pipe.

It will therefore be seen from the above that the galley insert chilled beverage dispensing device of the present disclosure may therefore enable the dispensing of chilled beverages from a vehicle galley (such as an aircraft galley). This offers an improved customer experience over the usual offering of hot water, or cold beverages served from cans or bottles with ice since ice cold beverages can be served, rather than a customer having to wait for ice to cool down their drink (which dilutes the drink). Further, since the beverage is stored in the storage tank, rather than in individual serving cans and bottles, the weight associated with these cans and bottles can be eliminated, a factor particularly useful on airplanes.

What is claimed is:

1. A galley insert chilled beverage dispensing device comprising:
   a body configured to be inserted into a vehicle galley insert, wherein the body comprises an integrated storage tank configured to store a beverage;
   a filling inlet comprising a spout provided on a front face of the galley insert chilled beverage dispensing device, the filling inlet fluidly connected to the storage tank;
   an output faucet fluidly connected to the storage tank; and
   a cooling system configured to cool the beverage stored in the storage tank.

2. The galley insert chilled beverage dispensing device of claim 1, wherein the cooling system comprises a cooling element in thermal communication with the storage tank.

3. The galley insert chilled beverage dispensing device of claim 2, wherein the cooling element is in contact with an outer surface of the storage tank.

4. The galley insert chilled beverage dispensing device of claim 2, wherein the cooling element comprises an evaporator element, and wherein the cooling system further comprises a condenser element located remote from the storage tank, and a compressor fluidly connected between the evaporator element and the condenser element.

5. The galley insert chilled beverage dispensing device of claim 1, wherein the cooling system is configured to cool the beverage to below 0° C.

6. The galley insert chilled beverage dispensing device of claim 5, wherein the cooling system is configured to cool the beverage to temperatures in the range 0° C. to −6° C.

7. The galley insert chilled beverage dispensing device of claim 1, comprising a pump configured to draw the beverage from the storage tank and out of the output faucet.

8. The galley insert chilled beverage dispensing device of claim 1, wherein the storage tank has a capacity in the range 10-25 litres.

9. The galley insert chilled beverage dispensing device of claim 1, comprising a pressure release valve fluidly connected to the storage tank and configured to release pressure from the storage tank when pressure in the storage tank exceeds a predetermined threshold value.

10. The galley insert chilled beverage dispensing device of claim 1, wherein the spout is moveable between an open position, in which a liquid can be added to the storage tank, and a closed position, in which liquid cannot be added to the storage tank.

11. The galley insert chilled beverage dispensing device of claim 1, comprising a storage tank waste pipe fluidly connected to the storage tank and to a waste outlet, wherein the storage tank waste pipe is configured to drain the storage tank.

12. The galley insert chilled beverage dispensing device of claim 1, comprising a sink positioned below the output faucet and configured to capture any spilled beverage, optionally wherein the galley insert chilled beverage dispensing device further comprises a sink waste pipe fluidly connected to the sink and to a waste outlet, wherein the sink waste pipe is configured to drain the sink.

13. The galley insert chilled beverage dispensing device of claim 1, comprising a liquid level sensor configured to provide information indicative of a fill level of the storage tank.

14. The galley insert chilled beverage dispensing device of claim 1, comprising a temperature sensor configured to provide information indicative of the temperature of the beverage inside the storage tank.

\* \* \* \* \*